(12) United States Patent
Conover et al.

(10) Patent No.: US 8,065,567 B1
(45) Date of Patent: Nov. 22, 2011

(54) SYSTEMS AND METHODS FOR RECORDING BEHAVIORAL INFORMATION OF AN UNVERIFIED COMPONENT

(75) Inventors: Matthew Conover, Palo Alto, CA (US); Tzi-cker Chiueh, Setauket, NY (US)

(73) Assignee: Symantec Corporation, Mountain View, CA (US)

( * ) Notice: Subject to any disclaimer, the term of this patent is extended or adjusted under 35 U.S.C. 154(b) by 290 days.

(21) Appl. No.: 12/397,009

(22) Filed: Mar. 3, 2009

(51) Int. Cl.
*G06F 21/00* (2006.01)
(52) U.S. Cl. ............ 714/45; 714/38.1; 726/22; 726/23; 726/24; 726/25
(58) Field of Classification Search .............. 714/38.1, 714/45; 726/22
See application file for complete search history.

(56) References Cited

U.S. PATENT DOCUMENTS

| | | | | |
|---|---|---|---|---|
| 5,832,208 | A * | 11/1998 | Chen et al. ................ | 726/24 |
| 7,213,246 | B1 * | 5/2007 | van Rietschote et al. ......... | 718/1 |
| 7,373,632 | B1 * | 5/2008 | Kawaguchi et al. .......... | 717/100 |
| 7,698,606 | B2 * | 4/2010 | Ladd et al. .................. | 714/48 |
| 2002/0133630 | A1 * | 9/2002 | Navare et al. ............... | 709/250 |
| 2002/0178381 | A1 * | 11/2002 | Lee et al. .................... | 713/201 |
| 2006/0021029 | A1 * | 1/2006 | Brickell et al. ............... | 726/22 |
| 2007/0174915 | A1 * | 7/2007 | Gribble et al. ............... | 726/24 |
| 2008/0072325 | A1 * | 3/2008 | Repasi et al. ................ | 726/23 |
| 2008/0256619 | A1 * | 10/2008 | Neystadt et al. ............. | 726/11 |
| 2008/0295181 | A1 * | 11/2008 | Dotan ......................... | 726/27 |
| 2009/0064309 | A1 * | 3/2009 | Boodaei et al. ............. | 726/12 |
| 2009/0138956 | A1 * | 5/2009 | Schneider ................... | 726/12 |
| 2009/0158260 | A1 * | 6/2009 | Moon et al. ................. | 717/133 |
| 2010/0077476 | A1 * | 3/2010 | Adams ........................ | 726/22 |
| 2010/0077481 | A1 * | 3/2010 | Polyakov et al. ............. | 726/24 |

OTHER PUBLICATIONS

Stokes et al., "ALADIN: Active Learning of Anomalies to Detect Intrusion.", Mar. 4, 2008, Microsoft Tech Report.*
Website: http://products.enterpriseitplanet.com/security/anti-virus/1111512716.html, GreenBorder, *Anti-Malware Protection Via Internet Access Isolation*, Jun. 2, 2009 (3 pgs.).
Website: http.www.sandboxie.com/, Introducing Sandboxie, May 26, 2009 (3 pgs.).

* cited by examiner

*Primary Examiner* — Scott Baderman
*Assistant Examiner* — Chae Ko
(74) *Attorney, Agent, or Firm* — Holland & Hart LLP (57) ABSTRACT

A computer-implemented method for recording behavioral information of an unverified component is described. Interactions between a first process and an unverified component loaded in the first process are monitored. A fault is detected from the monitored interactions. Information associated with an event is sent to a proxy module loaded in a second process. The execution of the event in the second process is verified. Information associated with the behavior of the unverified component during the execution of the event is recorded.

14 Claims, 7 Drawing Sheets

SYSTEMS AND METHODS FOR RECORDING BEHAVIORAL INFORMATION OF AN UNVERIFIED COMPONENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors.

A user of a computer system typically interacts with computer software running on the system via a user interface on a screen. Computer software may interact with additional software programs. For example, a host computer program may interact with a computer plug-in application. A plug-in may provide a certain function to the host application on demand. In some instances, the host application provides services which the plug-in can use. For example, the host application may provide a way for plug-ins to register themselves with the host application as well as a protocol for the exchange of data with the plug-ins.

Plug-ins and other components interacting with computer software depend on the services provided by the host application. Open application programming interfaces (APIs) typically provide a standard interface, allowing third parties to create plug-ins that interact with the host application. However, third parties may create malicious plug-ins and other components that impede the performance of the computer software, extract sensitive information about the user of the computer software (e.g., financial information, identification, etc.), and engage in other malicious activities. As such, benefits may be realized by providing improved systems and methods for monitoring and recording the behavior of unknown components (such as plug-ins) as they execute an event. The monitored and recorded behavior may then allow a determination to be made as to whether the plug-in or other unknown component is a malicious or non-malicious component.

SUMMARY

A computer-implemented method for recording behavioral information of an unverified component is described. Interactions between a first process and an unverified component loaded in the first process may be monitored. A fault may be detected from the monitored interactions. Information associated with an unexecuted event may be sent to a proxy module loaded in a second process. Verification may be received from the proxy module that the event has been executed in the second process. Information associated with the behavior of the unverified component during the execution of the event may be recorded.

In one embodiment, the unverified component is a plug-in application. A copy of the unverified component may be created and the memory of the created copy of the unverified component may be marked as inaccessible. In one configuration, the created copy of the unverified component may be loaded in the second process.

A fault may be detected when the unverified component requests the first process to execute an event. In addition, a fault may be detected when the second process requests the created copy of the unverified component to execute a request. Information associated with an unexecuted event may be sent to a proxy module loaded in the first process. Verification may be received from the proxy module that the event has been executed in the first process. Further, information associated with the behavior of the unverified component during the execution of the event may be recorded. In one embodiment, the second process is a copy of the first process. The second process may be isolated and separated from the first process.

A computer system configured to record behavioral information of an unverified component is also described. The computer system includes a processor and memory in electronic communication with the processor. The computer system further includes a first proxy module loaded in a first process. The first proxy module may be configured to monitor interactions between the first process and an unverified component loaded in the first process and detect a fault from the monitored interactions. The first proxy module may also be configured to send information associated with an unexecuted event to a second proxy module loaded in a second process and receive verification from the second proxy module that the event has been executed in the second process. In addition, the first proxy module may be configured to record information associated with the behavior of the unverified component during the execution of the event.

A computer-program product for recording behavioral information of an unverified component is also described. The computer-program product may comprise a computer-readable medium having instructions thereon. The instructions may comprise code programmed to monitor interactions between a first process and an unverified component loaded in the first process. The instructions may also comprise code programmed to detect a fault from the monitored interactions and code programmed to send information associated with an unexecuted event to a proxy module loaded in a second process. In addition, the instructions may comprise code programmed to receive verification from the proxy module that the event has been executed in the second process and code programmed to record information associated with the behavior of the unverified component during the execution of the event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION OF EXEMPLARY EMBODIMENTS

Figure 1:
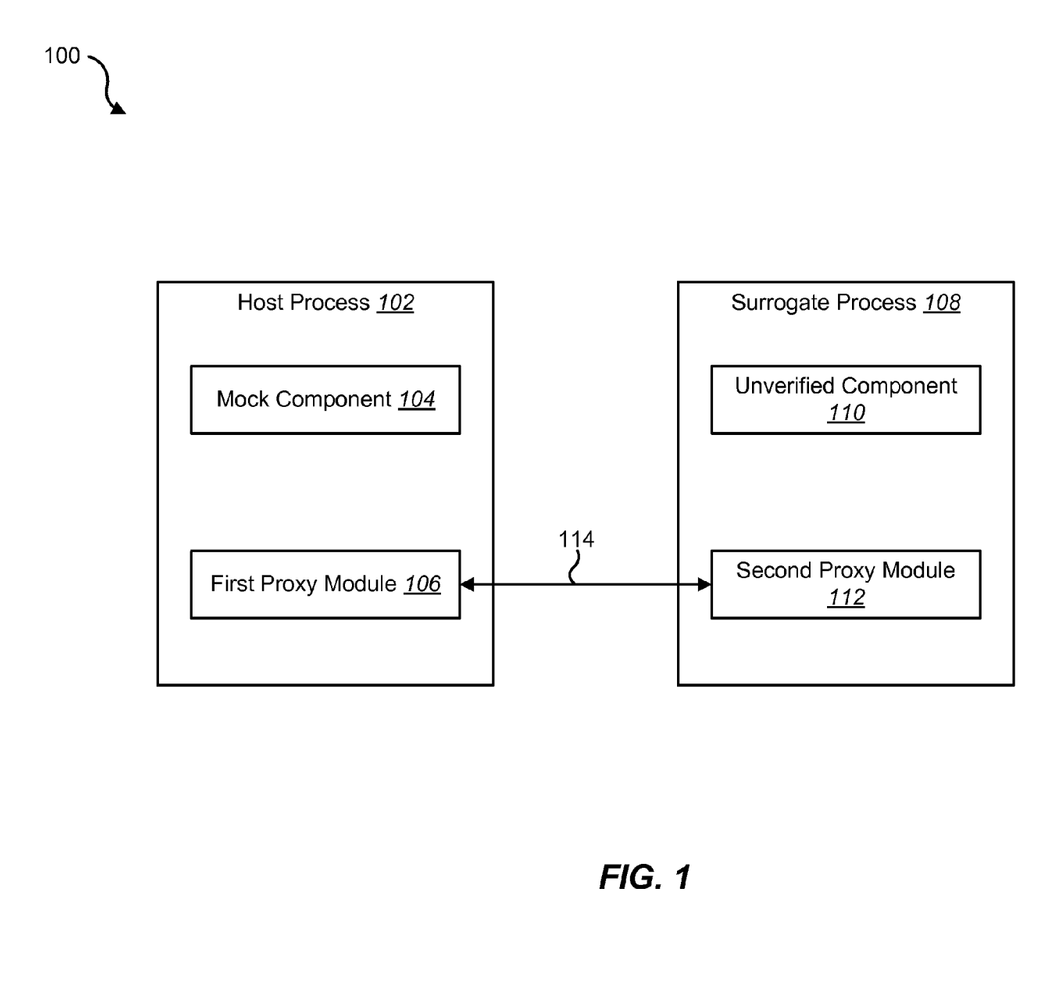
FIG. 1 is a block diagram illustrating one embodiment of a monitoring environment in accordance with the present system and methods.

FIG. 1 is a block diagram illustrating one embodiment of a monitoring environment 100. In one example, the environment 100 includes a host process 102. The host process 102 may include a mock component 104 and a first proxy module 106. In one embodiment, the host process 102 may be a program or an application that is executed on a computing device. For example, the host process 102 may be a web browser, such as Internet Explorer. In one embodiment, the mock component 104 may be a mock of an unverified component 110 that is loaded in a surrogate process 108. The surrogate process 108 may be separate and isolated from the host process 102. In one embodiment, the surrogate process 108 may be similar in purpose and design as the host process 102.

In one embodiment, the unverified component 110 and the mock component 104 may be a plug-in. For example, the components 104, 110 may be computer programs that interact with the host process 102 and the surrogate process 108 in order to provide a particular function to the processes 102, 108. One difference between the mock component 104 and the unverified component 110 is that the memory of the mock component 104 may be unmapped so that requests from the host process 102 to access the mock component 104 may cause a fault to occur. However, the memory of the unverified component 110 may be mapped so that the surrogate process 108 may be enabled to interact with the unverified component 110.

In one example, the mock component 104 is identical to the unverified component 110 with the difference being that the memory of the mock component 104 is unmapped which causes an error to occur when interactions between the host process 102 and the mock component 104 are detected. The host process 102 and the surrogate process 108 may include a first proxy module 106 and a second proxy module 112, respectively. The first proxy module 106 may monitor the interactions between the host process 102 and the mock component 104. Similarly, the second proxy module 112 may monitor the interactions between the surrogate process 108 and the unverified component 110.

In one embodiment, the first proxy module 106 may detect faults that occur when the host process 102 attempts to interact with the mock component 104. For example, the host process 102 may attempt to communicate with the mock component in order to request the component 104 to carry out a certain event. For example, the host process 102 may be Internet Explorer and the mock component 104 may be an Internet Explorer plug-in (known as a "browser help object" (BHO)). In one embodiment, Internet Explorer (i.e., the host process 102) may make calls to the plug-in (i.e., the mock component 104) in order to notify the plug-in of new events. For example, Internet Explorer may call the plug-in when a web page is about to be loaded when a web page has finished loading.

Because the mock component 104 is unmapped, an error occurs when the host process 102 attempts to communicate with the mock component 104. Upon detecting a fault, the first proxy module 106 may communicate 114 with the second proxy module 112. In one embodiment, the first proxy module 106 may communicate 114 information regarding the event the host process 102 attempted to have the mock component 104 carry out.

In one embodiment, the second proxy module 112 may monitor the interactions between the surrogate process 108 and the unverified component 110. In one configuration, the unverified component 110 may function as if it were loaded into the host process 102. In other words, when the unverified component 110 attempts to interact with the surrogate process 108, the component 110 functions as if it were attempting to interact with the host process 102 to carry out a certain event. Because the surrogate process 108 is isolated from the host process 102, a fault may occur when the unverified component 110 attempts to interact with the surrogate process 108. The second proxy module 112 may detect these faults. The second proxy module 112 may then communicate 114 these faults and information about the unexecuted event to the first proxy module 106. Details regarding the proxy modules 106, 112 will be discussed in further details below.

Figure 2:
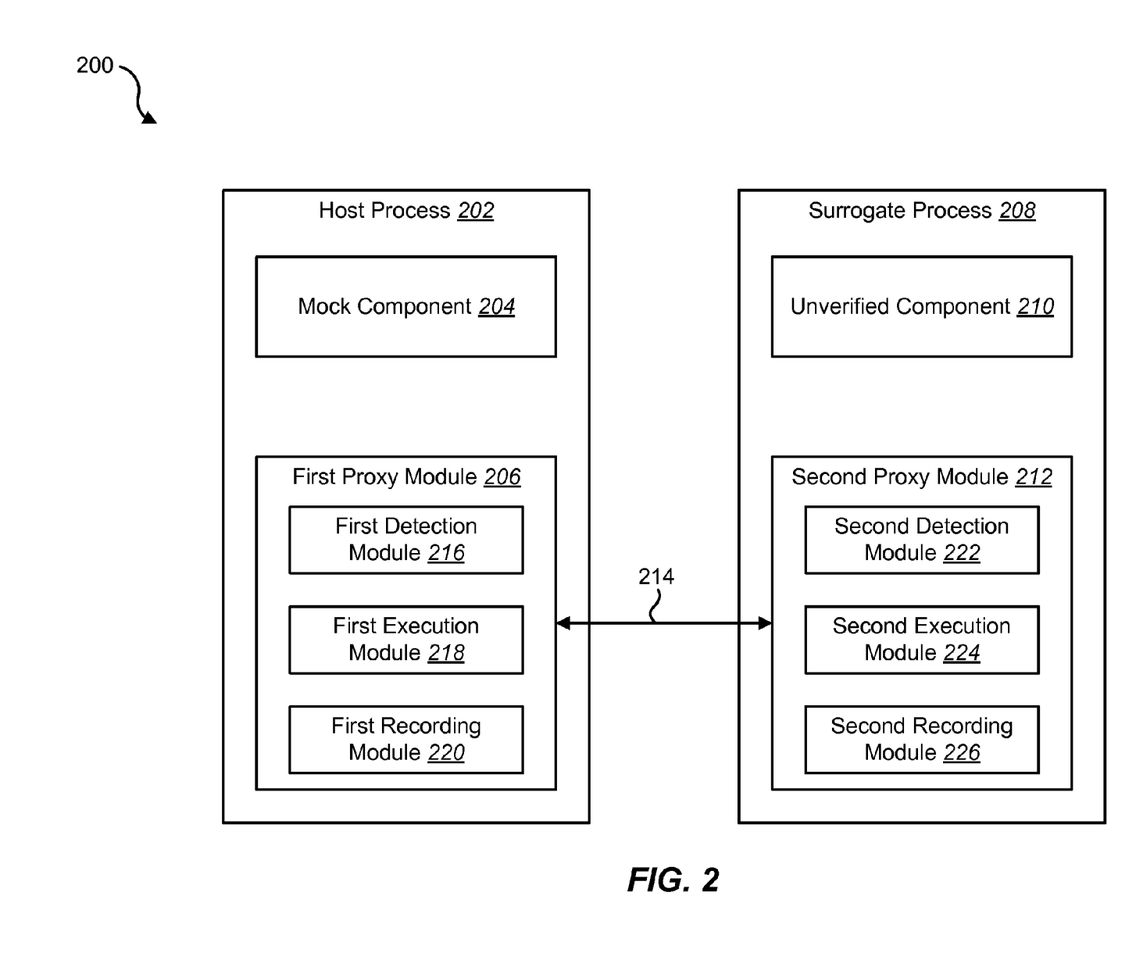
FIG. 2 is a block diagram illustrating a further embodiment of the monitoring environment.

FIG. 2 is a block diagram illustrating a further embodiment of the monitoring environment 200. In one example, the monitoring environment 200 includes a host process 202 and a surrogate process 208. As previously explained, the surrogate process 208 may be similar in design and function as the host process 202, but the surrogate process 208 may be isolated and separate from the host process 202. In one configuration, the host process 202 includes a mock component 204. The mock component 204 may be a plug-in, however, the memory of the mock component 204 may be unmapped so that interactions between the host process 202 and the mock component 204 may cause a fault to occur. The host process 202 may also include a first proxy module 206.

In one embodiment, the first proxy module 206 includes a first detection module 216, a first execution module 218, and a first recording module 220. In one example, the first detection module 216 may detect faults that occur when the host process 202 attempts to interact with the mock component 204 in order to request the mock component 204 to execute an event. When the first detection module 216 detects a fault, the first proxy module 206 may communicate 214 with a second proxy module 212 that is loaded on the surrogate process 208. In one example, the first proxy module 206 communicates 214 information about the unexecuted event. The second proxy module 212 may receive the information from the first proxy module 206.

In one embodiment, the second proxy module 212 may include a second execution module 224 that may interact with the unverified component in order to execute the event that was originally requested by the host process 202. When the event is completed, the second proxy module 212 may communicate 214 the results back to the first proxy module 206. In one embodiment, the first recording module 220 records the results. For example, the first recording module 220 may record the actions taken by the unverified component 210 during the execution of the event.

The second proxy module 212 may also include a second detection module 222 and a second recording module 226. In one embodiment, the second detection module 222 detects errors or faults that occur between the surrogate process 208 and the unverified component 210. For example, the unverified component 210 may be a plug-in component that attempts to interact with the surrogate process 208 to carry out a certain event. The unverified component 210 may mistakenly believe that it 210 is interacting with the host process

202. However, application programming interfaces (APIs) may not exist between the host process 202 and the unverified component 210 because the component 210 is functioning in an isolated process (i.e., the surrogate process 208). A fault may be generated if the unverified component 210 attempts to interact with the surrogate process 208 to carry out an event. When the second execution module 224 detects a fault, the second proxy module 212 may communicate 214 to the first proxy module 206 details regarding the unexecuted event. In other words, the second proxy module 212 may communicate 214 the event that the unverified component 210 attempted to execute on the surrogate process 208. Upon receiving the communication 214 from the second proxy module 212, the first execution module 218 may facilitate the execution of the event on the host process 202. When the event has been executed, the first proxy module 206 may communicate 214 the results of the event back to the second proxy module 212. The second recording module 226 may record the results of the event as well as the actions taken by the host process 202 during the execution of the event.

Figure 3:
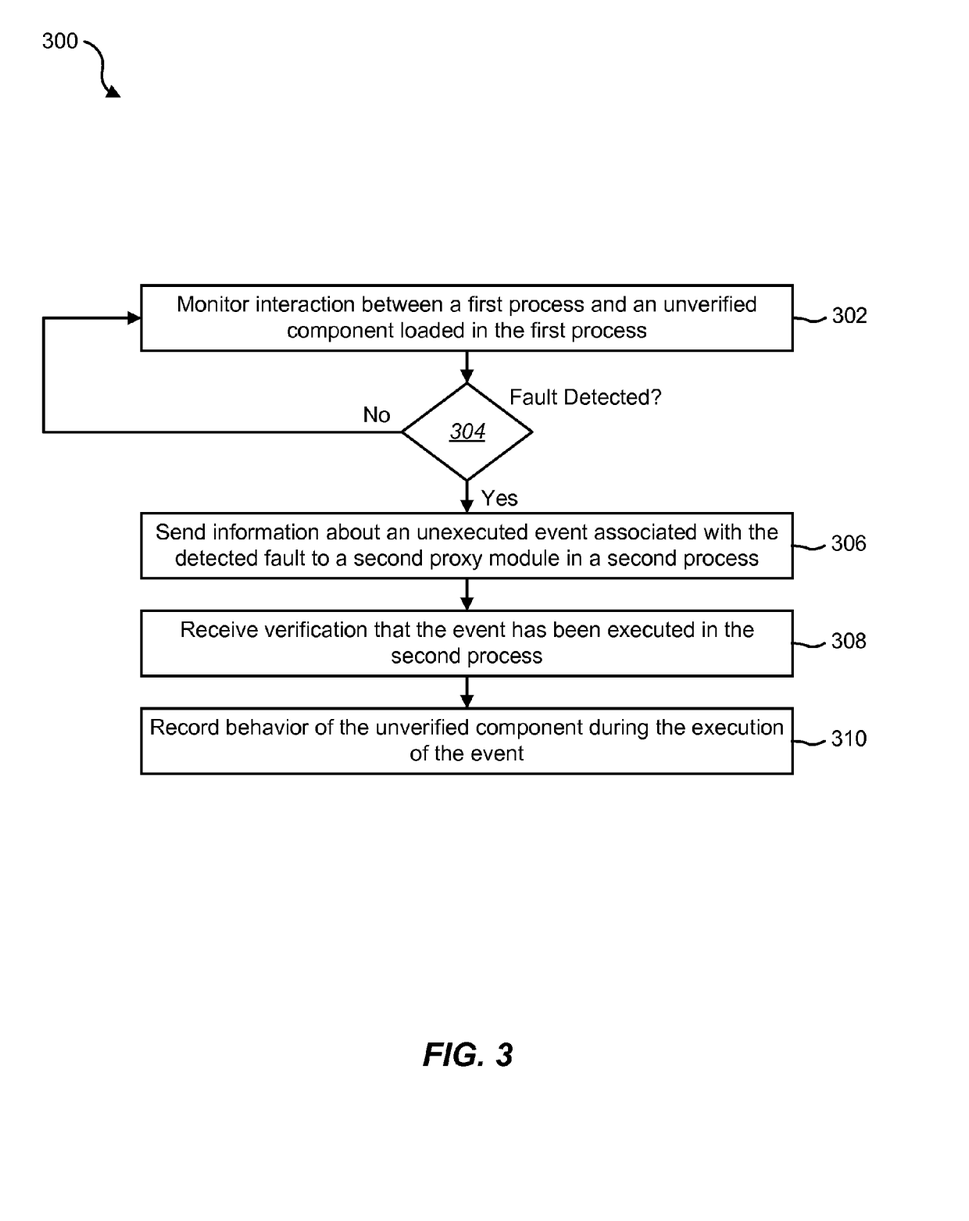
FIG. 3 is a flow diagram illustrating one embodiment of a method for recording the behavior of an unverified component.

FIG. 3 is a flow diagram illustrating one embodiment of a method 300 for recording the behavior of an unverified component. In one example, the method 300 may be implemented by a proxy module. In one configuration, interaction between a first process and an unverified component loaded in the first process may be monitored 302. For example, requests from the first process to interact with the unverified component may be monitored 302. Similarly, requests from the unverified component to interact with the first process may also be monitored 302. The monitored requests may be requests to execute a particular event.

In one embodiment, a determination 304 may be made as to whether a fault is detected. In one example, a first proxy module loaded in the first process may determine 304 whether a fault is detected. A fault may be detected when certain interactions between the first process and the unverified component occur. For example, a request from the first process to the unverified component to carry out a certain event may cause a fault to occur. If it is determined 304 that no fault is detected, the method 300 may continue to monitor 302 interactions between the first process and the unverified component. However, if it is determined 304 that a fault is detected, information about the unexecuted event associated with the detected fault may be sent 306 from the first proxy module to a second proxy module. In one embodiment, the second proxy module may be loaded in a second process that is separate and isolated from the first process. The second proxy module may facilitate the execution of the event upon receiving the information from the first proxy module.

In one configuration, verification may be received 308 that the event has been executed in the second process. In addition, the behavior of the unverified component during the execution of the event may be recorded 310. In other words, when an event is executed, the behavior of the unverified component may be recorded 310 for future analysis. For example, the application programming interfaces (APIs) called by the unverified component may be recorded. In addition, the global variables (i.e., external data) that the unverified component attempts to read or modify may also be recorded. The APIs and global variables used by the unverified component may provide behavioral characteristics of the unverified component. For example, if the unverified component is an Internet Explorer plug-in, the component may attempt to direct a web browser to a fake website of a financial institution (such as a bank). In this example, the APIs and the uniform resource locator (URL) of the malicious website that are called by the unverified component are recorded to provide behavioral characteristics of the component.

Figure 4:
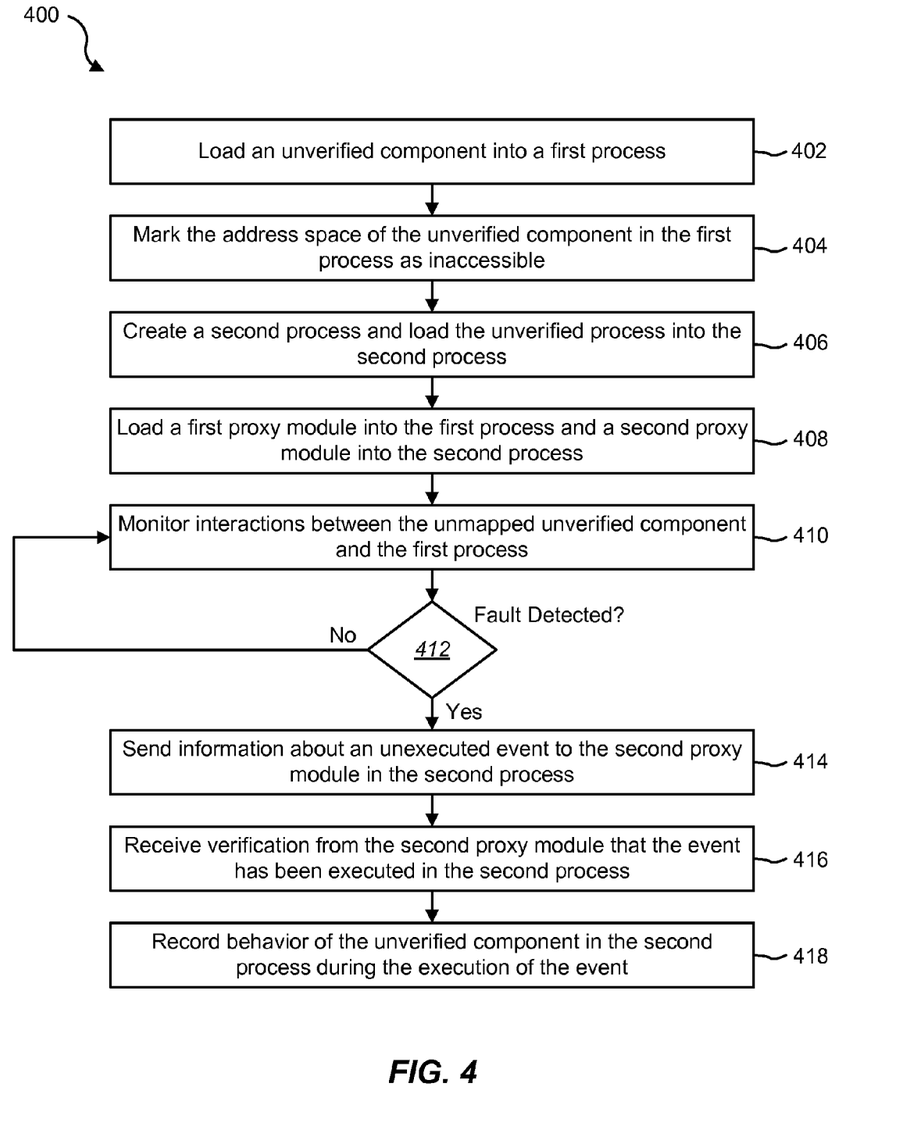
FIG. 4 is a flow diagram illustrating one embodiment of a method for monitoring interactions between an unverified component and a process.

FIG. 4 is a flow diagram illustrating one embodiment of a method 400 for monitoring interactions between an unverified component and a process. In one embodiment, the method 400 may be implemented by a proxy module as described above.

In one configuration, an unverified component, such as a plug-in, may be loaded 402 into a first process. The first process may be a web browser, an e-mail exchange application, etc. In one embodiment, the address space of the unverified component in the first process may be marked 404 as inaccessible. In other words, from the perspective of the first process, the unverified module is loaded and functioning properly. However, because the address space of the unverified component is marked as inaccessible, requests sent by the first process to the component requesting that the component execute an event, may cause a fault to occur.

In one embodiment, a second process may be created 406, and the unverified component may be loaded into the second process. When the unverified component is loaded into the second process, the address space of the component may remain accessible. In one configuration, a first proxy module may be loaded 408 into the first process and a second proxy module may be loaded 408 into the second process. In one example, the second process may be isolated and separated from the first process.

In one embodiment, interactions between the unmapped unverified component and the first process may be monitored 410. For example, calls originating from the first process to the unmapped unverified component may be monitored 410. In one example, the first proxy module loaded in the first process monitors 410 these interactions. A determination 412 may be made as to whether a fault is detected while the interactions are being monitored 410. If it is determined 412 that a fault is not detected, the method 400 may continue to monitor 410 the interactions between the unmapped unverified component and the first process. However, it is determined 412 that a fault is detected, information about an unexecuted event may be sent 414 to the second proxy module in the second process. In one embodiment, verification from the second proxy module that the event has been executed in the second process may be received 416. In addition, the behavior of the unverified component during the execution of the event in the second process may be recorded 418. For example, requests for data by the unverified component, data accessed by the unverified component, etc. during the execution of the event may be recorded 418.

Figure 5:
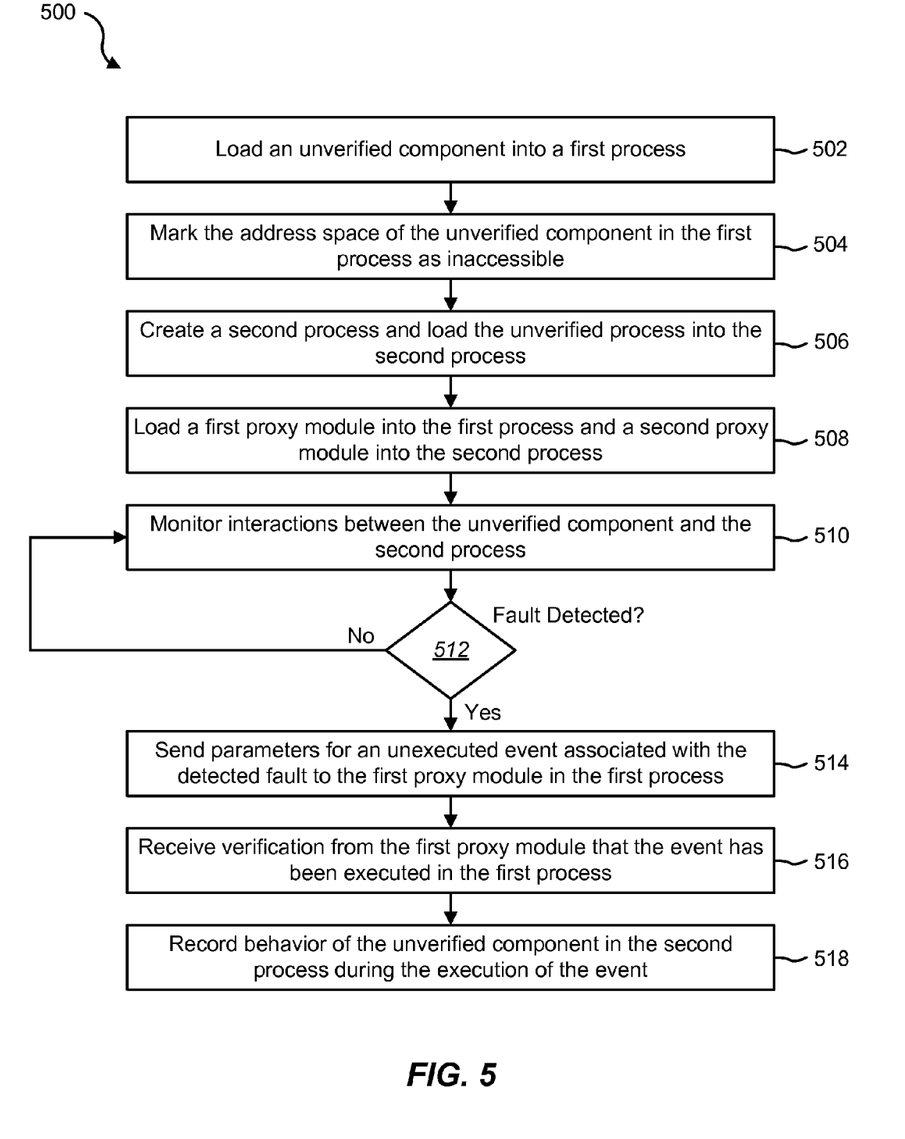
FIG. 5 is a flow diagram illustrating another embodiment of a method for monitoring interactions between an unverified component and a process.

FIG. 5 is a flow diagram illustrating another embodiment of a method 500 for monitoring interactions between an unverified component and a process. In one embodiment, the method 500 may be implemented by a proxy module as described above.

In one configuration, an unverified component, such as a plug-in, may be loaded 502 into a first process. The first process may be a web browser, an e-mail exchange application, etc. In one embodiment, the address space of the unverified component in the first process may be marked 504 as inaccessible. In other words, from the perspective of the first process, the unverified module is loaded and functioning properly. However, because the address space of the unverified component is marked as inaccessible, requests sent by the first process to the component requesting that the component execute an event, may cause a fault to occur.

In one embodiment, a second process may be created 506, and the unverified component may be loaded into the second process. When the unverified component is loaded into the second process, the address space of the component may remain accessible. In one configuration, a first proxy module may be loaded 508 into the first process and a second proxy module may be loaded 508 into the second process. In one example, the second process may be isolated and separated from the first process.

In one embodiment, interactions between the unverified component and the second process may be monitored 510. For example, calls originating from the unverified component to the second process may be monitored 510. In one example, the second proxy module loaded in the second process monitors 510 these interactions. A determination 512 may be made as to whether a fault is detected while the interactions are being monitored 510. A fault may be detected if the unverified component requests the second process to carry out a particular event. If it is determined 512 that a fault is not detected, the method 500 may continue to monitor 510 the interactions between the unverified component and the second process. However, it is determined 512 that a fault is detected, information about an unexecuted event may be sent 514 to the first proxy module in the first process. In one embodiment, verification from the first proxy module that the event has been executed in the first process may be received 516. In addition, the behavior of the unverified component and the first process during the execution of the event in the first process may be recorded 518. For example, requests for data, data accessed, etc. during the execution of the event may be recorded 518 for future analysis.

Figure 6:
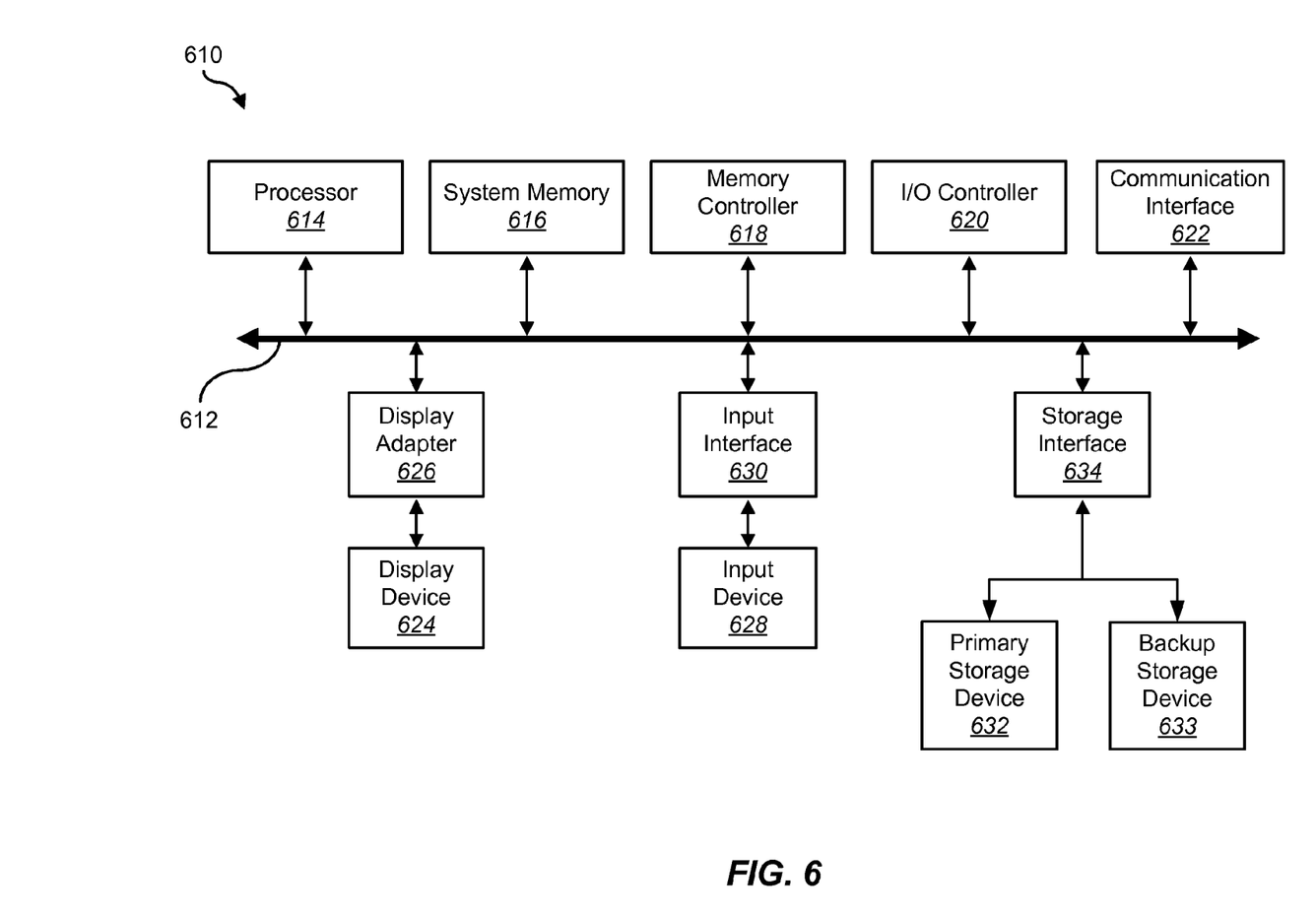
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the monitoring, detecting, sending, verifying, and recording steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as monitoring, detecting, sending, verifying, and recording.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for monitoring, detecting, sending, receiving, and recording steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the monitoring, detecting, sending, receiving, and recording steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the monitoring, detecting, sending, verifying, and recording steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the monitoring, detecting, sending, receiving, and recording steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
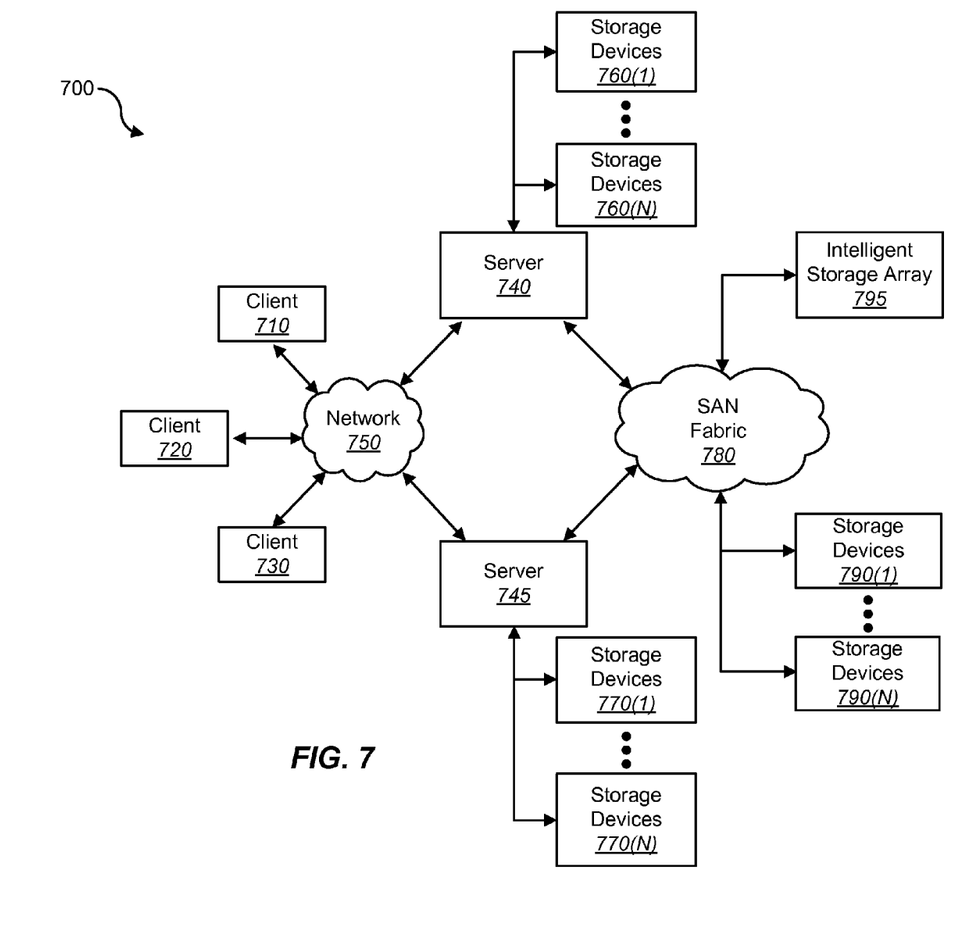
FIG. 7 is a block diagram of an exemplary network architecture in accordance with the present systems and methods.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the monitoring, detecting, sending, verifying, and recording steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for recording behavioral information of an unverified component that may comprise: 1) monitoring interactions between a first process and an unverified component loaded in the first process, 2) detecting a fault from the monitored interactions, 3) sending information associated with an event to a proxy module loaded in a second process, 4) verifying that the event has been executed in the second process, and then 5) recording information associated with the behavior of the unverified component during the execution of the event. The network resource may represent a networked device or a network service.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for recording behavioral information of an unverified component, the method comprising:

monitoring for interactions between a first process and a copy of an unverified component loaded in the first process;

marking memory of the copy of the unverified component as inaccessible;

detecting an error from the monitored interactions, wherein the error is a result of the first process requesting access to the memory of the copy of the unverified component;

sending information associated with the access request to a proxy module loaded in a second process;

verifying that the access request has been executed by the unverified component, wherein the unverified component is loaded in the second process; and recording information associated with the behavior of the unverified component loaded in the second process during the execution of the access request.

2. The method of claim 1, wherein the unverified component is a plug-in application.

3. The method of claim 1, further comprising detecting a fault when the unverified component requests the second process to execute an event.

4. The method of claim 1, further comprising detecting a fault when the second process requests the unverified component to execute a request.

5. The method of claim 4, further comprising sending information associated with an unexecuted event to a proxy module loaded in the first process, receiving verification from the proxy module that the event has been executed in the first process, and recording information associated with the behavior of the first process during the execution of the event.

6. The method of claim 1, wherein the second process is a copy of the first process.

7. The method of claim 1, wherein the second process is isolated and separated from the first process.

8. A computer system configured to record behavioral information of an unverified component, the computer system comprising:
   a processor;
   memory in electronic communication with the processor; and
   a first proxy module loaded in a first process configured to:
      monitor for interactions between the first process and a copy of an unverified component loaded in the first process;
      mark memory of the copy of the unverified component as inaccessible;
      detect an error from the monitored interactions, wherein the error is a result of the first process requesting access to the memory of the copy of the unverified component;
      send information associated with the access request to a second proxy module loaded in a second process;
      verify that the access request has been executed by the unverified component, wherein the unverified component is loaded in the second process; and
      record information associated with the behavior of the unverified component loaded in the second process during the execution of the access request.

9. The computer system of claim 8, wherein the unverified component is a plug-in application.

10. The computer system of claim 8, wherein the first proxy module is further configured to detect a fault when the unverified component requests the second process to execute an event.

11. The computer system of claim 8, wherein the second proxy module is further configured to detect a fault when the second process requests the unverified component to execute a request.

12. The computer system of claim 11, wherein the second proxy module is further configured to send information associated with an unexecuted event to the first proxy module loaded in the first process, receive verification from the first proxy module that the event has been executed in the first process, and record information associated with the behavior of the first process during the execution of the event.

13. The computer system of claim 8, wherein the second process is a copy of the first process and is isolated and separated from the first process.

14. A computer-program product for recording behavioral information of an unverified component, the computer-program product comprising a non-transitory physical computer-readable medium having instructions thereon, the instructions comprising:
   code programmed to monitor for interactions between a first process and a copy of an unverified component loaded in the first process;
   code programmed to mark memory of the copy of the unverified component as inaccessible;
   code programmed to detect an error from the monitored interactions, wherein the error is a result of the first process requesting access to the memory of the copy of the unverified component;
   code programmed to send information associated with the access request to a proxy module loaded in a second process;
   code programmed to verify that the access request has been executed by the unverified component, wherein the unverified component is loaded in the second process; and
   code programmed to record information associated with the behavior of the unverified component loaded in the second process during the execution of the access request.

* * * * *